(12) United States Patent
Biessenberger et al.

(10) Patent No.: US 8,368,237 B2
(45) Date of Patent: Feb. 5, 2013

(54) STARTER DEVICE

(75) Inventors: Thomas Biessenberger, Schorndorf (DE); Hartmut Wanner, Herrenberg-Oberjesingen (DE); Uwe Daurer, Kornwestheim (DE); Oliver Neumann, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 510 days.

(21) Appl. No.: 12/452,623

(22) PCT Filed: Jul. 14, 2008

(86) PCT No.: PCT/EP2008/059175
§ 371 (c)(1),
(2), (4) Date: Mar. 25, 2010

(87) PCT Pub. No.: WO2009/007465
PCT Pub. Date: Jan. 15, 2009

(65) Prior Publication Data
US 2010/0213713 A1    Aug. 26, 2010

(30) Foreign Application Priority Data
Jul. 12, 2007   (DE) .................. 10 2007 032 857

(51) Int. Cl.
*F02N 11/00*   (2006.01)
(52) U.S. Cl. ..................................... 290/38 R
(58) Field of Classification Search ............. 290/38 R, 290/34
See application file for complete search history.

(56) References Cited

U.S. PATENT DOCUMENTS

| 1,903,761 | A | | 4/1933 | Guettner, Jr. |
| 4,209,816 | A | * | 6/1980 | Hansen ........................... 361/23 |
| 4,731,543 | A | | 3/1988 | Buetemeister et al. |
| 8,159,078 | B2 | * | 4/2012 | Usselman et al. ............ 290/1 A |
| 2002/0014216 | A1 | * | 2/2002 | Boegner et al. ............ 123/179.3 |
| 2002/0038643 | A1 | * | 4/2002 | Sumimoto et al. ......... 123/179.3 |
| 2002/0140291 | A1 | | 10/2002 | Osada et al. |
| 2003/0070645 | A1 | * | 4/2003 | Osada et al. ............... 123/179.3 |

FOREIGN PATENT DOCUMENTS

| DE | 100 59 902 | 6/2002 |
| DE | 102 03 147 | 10/2002 |
| DE | 10 2006 034 837 | 2/2007 |
| FR | 57101 | 12/1952 |
| FR | 2 797 536 | 2/2001 |
| JP | 59-159143 | 10/1984 |
| JP | 6-69361 | 9/1994 |
| JP | 11-190266 | 7/1999 |
| JP | 2002-303230 | 10/2002 |
| JP | 2007-40270 | 2/2007 |

* cited by examiner

*Primary Examiner* — Tho D Ta
(74) *Attorney, Agent, or Firm* — Kenyon & Kenyon LLP

(57) ABSTRACT

A starter device for cranking internal combustion engines, that has a terminal for starter control, having an electric starter motor, there being an electric supply line from a plus terminal of the starter device to the plus terminal of the starter motor, and the starter motor having an electrical ground return line at a minus terminal of the starter device, in which the ground return line is interrupted by a switch in the case of an electrical potential-free terminal for the starter control.

10 Claims, 4 Drawing Sheets

Fig. 4a     Fig. 4b

STARTER DEVICE

FIELD OF THE INVENTION

The present invention relates to a starter device for cranking an internal combustion engine.

BACKGROUND INFORMATION

There are starter devices for starting internal combustion engines.

SUMMARY OF THE INVENTION

An exemplary embodiment of the present invention relates to a starter device for cranking an internal combustion engine, including: a plus terminal; an electric starter motor having another plus terminal and a minus terminal; a terminal for providing a starter control, having the electric starter motor; an electric supply line from the plus terminal to the another plus terminal of the starter motor; in which the starter motor has an electrical return line to the minus terminal, and in which the return line is interrupted by a switch in the case of an electrical potential-free terminal for the starter control.

BRIEF DESCRIPTION OF THE DRAWINGS

FIG. 4a shows a starter motor which may be a permanent magnet motor.

FIG. 4b shows a starter device using a series-wound motor.

DETAILED DESCRIPTION

Figure 1:
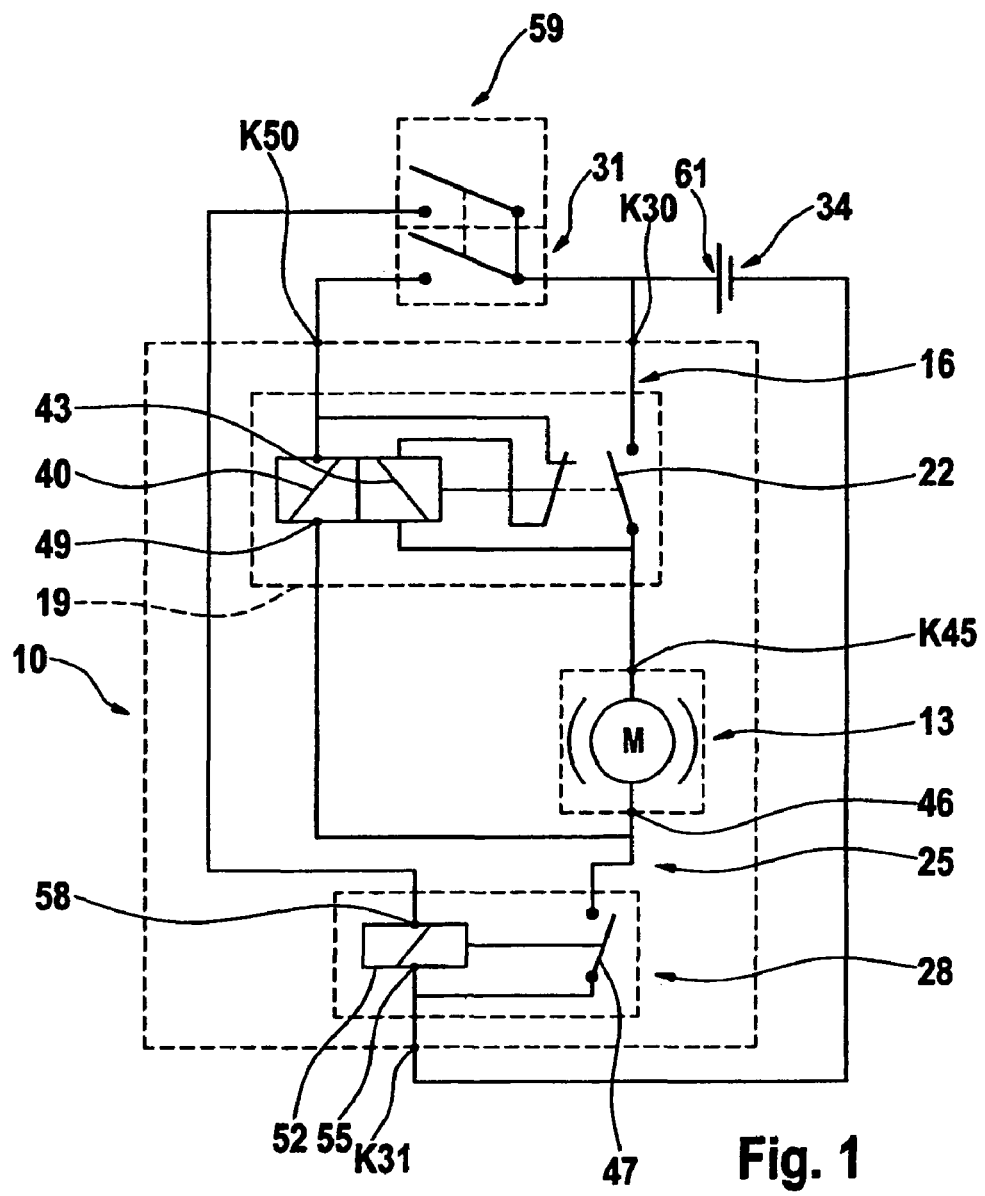
FIG. 1 shows a starter device for cranking an internal combustion engine having a connection terminal for starter control.

FIG. 1 schematically shows a starter device 10 for cranking an internal combustion engine, not shown, having a connection K50 (terminal 50) for starter control. Starter device 10 has an electric starter motor 13, which drives a pinion, not shown, which engages with a toothed wheel of the internal combustion engine, in case of a start. There is an electric supply line 16 from a plus connection K30 (terminal 30) of starter device 10 to plus connection K45 (terminal 45) of starter motor 13, which is switchable by a starter solenoid switch 19, or rather its switching contact 22. An electric return line 25, that is insulated from the environment, leads from starter motor 13 to a minus connection K31 (terminal 31) of starter device 10. It is provided that, in response to an electrically voltage-free terminal K50 for the starter control, return line 25 from starter motor 13 to minus terminal K31 be interrupted by a switch 28.

Starter device 10 according to FIG. 1 is designed so that switch 28 in ground return line 25 is an electromagnetic switch 28 having an electromagnetic coil 52, that is electrically connected using its minus terminal 55 to minus terminal K31 of starter device 10 and using its plus terminal 58, is electrically connected to a switch 59. Minus terminal (K31) of starter device 10 is electrically insulated from a housing of the starter device.

When a starter switch 31 is operated, electromagnetic coil 52, or rather its plus terminal 58, is simultaneously, or nearly simultaneously connected to positive pole 61 of battery 34 by switch 59. Starter switch 31 and switch 59 are designed in this case as coupled switches, so that by operating starter switch 31, switch 59 is closed at the same time. Coil 52, having current applied to it thereby, closes switching contact 47, so that a terminal 46 on the minus side of starter motor 13 is electrically connected to the potential of negative connection K31 (terminal 31) of starter device 10. When starter switch 31 is operated (closed), positive electrical potential is applied both to terminal K50 and to plus terminal 58 of switch 28, which is provided by battery 34. At the same time, a hold-in winding 40 and a pull-in winding 43 have current supplied to them, so that switching contact 22 is closed thereby, after the switching of switch 28. Because of that, positive electrical potential is present at plus connection K45 (terminal 45) of starter motor 13. At terminal K30 there is a positive potential, as shown in FIG. 1.

In this example, return line 25 is a bus line which is connected in an electrically conductive manner to minus side terminal 49 of hold-in winding 40 and minus side terminal 46 of starter motor 13.

It is provided that a plurality of cathodic brushes is electrically conductively connected to a commutator of the rotor be connected at minus side terminal 46 of starter motor 13.

If starter motor 13 is provided with an electrically excited stator, which has excitation coils arranged around pole shoes, the latter are electrically connected indirectly to minus side terminal 46 of starter motor 13 via positive brushes and cathodic brushes, as well as via the commutator located between them. If starter motor 13 is designed as a permanent magnet motor excited by permanent magnets, only the rotor is electrically connected to minus side terminal 46 of starter motor 13.

Figure 2:
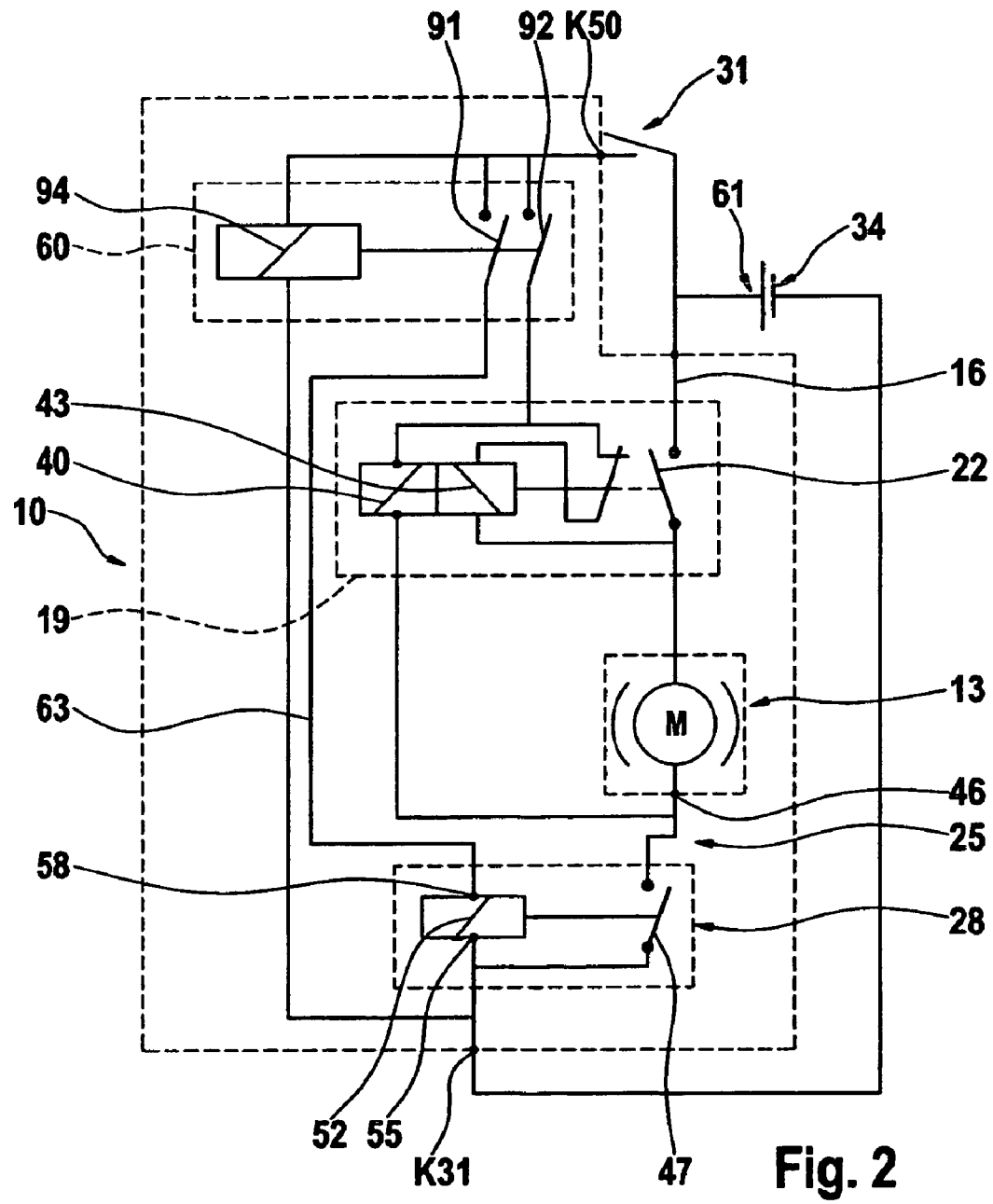
FIG. 2 shows a starter device.

As a modification of the first exemplary embodiment, FIG. 2 shows a starter device 10, switch 28 in return line 25 being an electromagnetic switch 28 having an electromagnetic coil 52, which is electrically connected at its minus terminal 55 to minus terminal K31 of starter device 10 and at its plus terminal 58 to terminal K50 of starter device 10, via an electric line 63 that is interruptible by a back-up switch 60. Back-up switch 60 has two jumpers 91 and 92 which are simultaneously switched by current being applied to winding 94 of back-up switch 60. Jumper 91 switches on switch 28, and jumper 92 switches on switch 19 and its windings 40 and 43.

Figure 3:
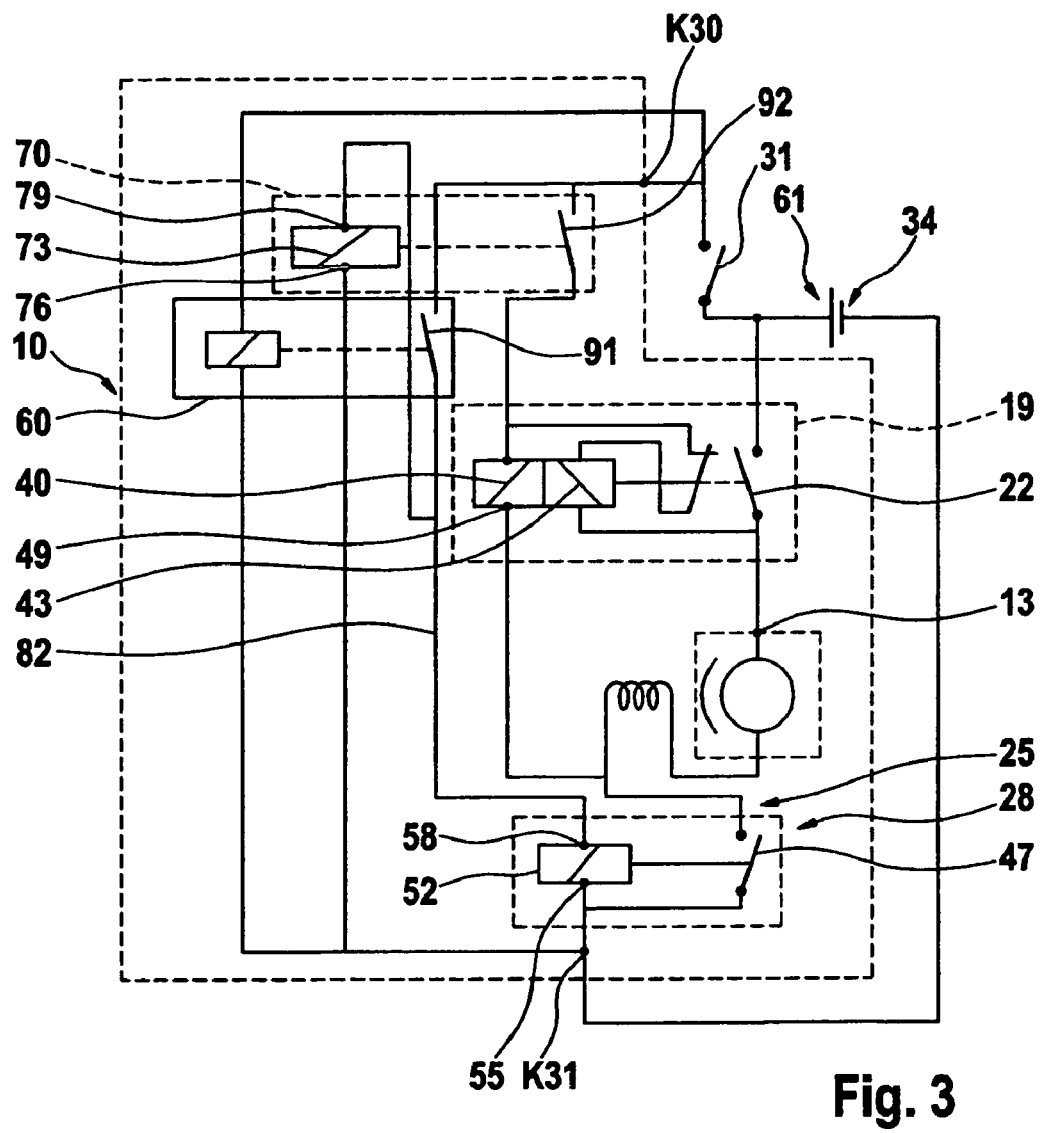
FIG. 3 shows a starter motor as a series-wound motor.

In an additional modification, FIG. 3 shows a starter device 10, an intermediate switch 70 being controllable by back-up switch 60, the former being an electromagnetic switch having an electromagnetic coil 73, which, at its minus terminal 76, is electrically connected to minus terminal K31 of starter device 10, and at its plus terminal 79 is electrically connected to plus terminal K30 for power current supply, via an electric line 82 that is interruptible by intermediate switch 60. Electric line 82 is switched on by junper 91 of switch 60, and windings 40 and 43 of starter solenoid switch 19 are switched on via jumper 92 of switch 70. FIG. 3 shows a starter motor 13 as a series-wound motor, which may alternatively also be designed as a permanent magnet motor 90 having permanent magnets 93, as in FIG. 4a. The exemplary embodiments according to FIGS. 1 and 2 may also be developed using a series-wound motor as in FIG. 4b.

Figure 4C:
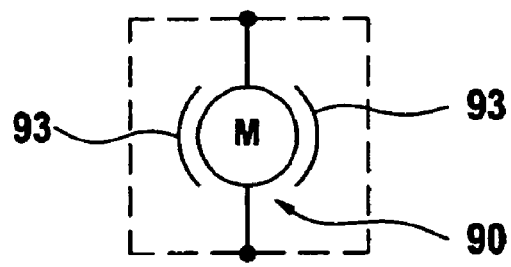
FIG. 4c shows an electronic switch.
Figure 4C:
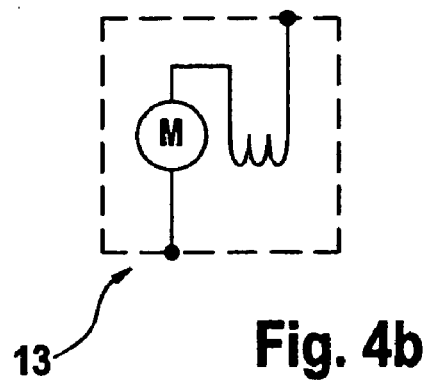
Figure 4C:
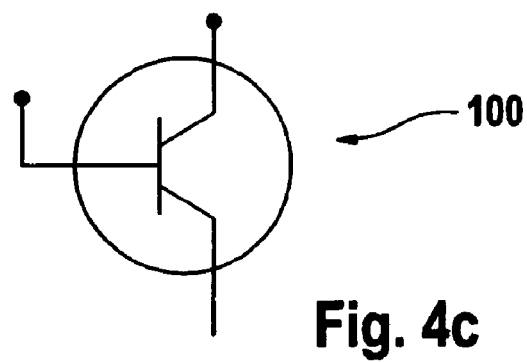

Switch 28 in return line 25 does not have to be developed as an electromagnetic switch, but may also be designed as an electronic switch 100, as in FIG. 4c. The same applies for switch 59, back-up switch 60 and intermediate switch 70.

Figure 5:
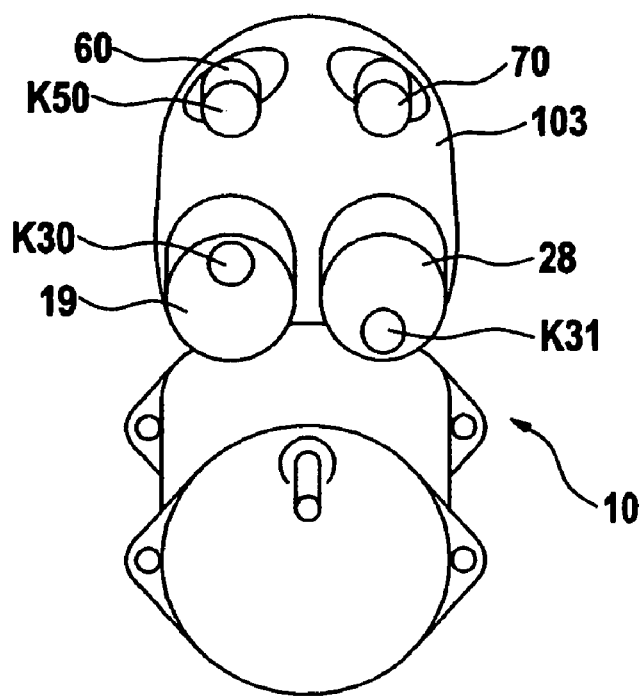
FIG. 5 shows (with reference to FIG. 3) that the starter device has a relatively large-surface drive-end bearing at which starter solenoid switch is fastened.

According to FIG. 5, it is provided with reference to the exemplary embodiment as in FIG. 3, that starter device 10 has a relatively large-surface drive-end bearing 103 at which not only starter solenoid switch 19 is fastened, but also back-up switch 60, intermediate switch 70 and switch 28 in return line 25.

In each of the exemplary embodiments, after the opening of starter switch 31 and the transition of switch 28 into the switched-off state, minus terminal K31 has no further contact to motor 13 of starter device 10, so that starter device 10, at this point, has a durable insulating resistance of more than 20 kOhm, or even more than 50 kOhm.

What is claimed is:

1. A starter device for cranking an internal combustion engine, comprising:
   a plus terminal;
   a minus terminal;
   an electric starter motor having another plus terminal and a minus terminal;
   a terminal for providing a starter control is electrically connected to the plus terminal of the starter device, having the electric starter motor;
   an electric supply line from the plus terminal of the starter device to the another plus terminal of the starter motor;
   an electric return line leads from the minus terminal of the electric starter motor to the minus terminal of the starter device; and
   wherein the electric return line is interrupted by a switch in order to provide an electrically voltage-free environment to the terminal for providing the starter control.

2. The starter device of claim 1, wherein the return line is a bus line which is connected in an electrically conductive manner to a minus side terminal of a hold-in winding and the minus side terminal of the starter motor.

3. The starter device of claim 1, wherein a plurality of cathodic brushes that are electrically conductively connected to a commutator of a rotor are electrically connected to the minus side terminal of the starter motor.

4. The starter device of claim 1, wherein the starter motor has an electrically excited stator having excitation coils positioned around the pole shoes, which are connected electrically to the minus side terminal of the starter motor.

5. The starter device of claim 1, wherein the starter motor has a stator having permanent magnets.

6. The starter device of claim 1, wherein the switch in the return line is an electromagnetic switch having an electromagnetic coil, which is electrically connected at its minus terminal to the minus terminal, and which is electrically connected at its plus terminal to the terminal of the starter device, via an electric line that is interruptible by a back-up switch.

7. The starter device of claim 1, wherein one of the switches is an electronic switch.

8. The starter device of claim 1, further comprising: a housing, wherein the minus terminal of the starter device is insulated from a housing of the starter device.

9. The starter device of claim 1, wherein the switch in a return line is an electromagnetic switch having an electromagnetic coil, which, at its minus terminal is electrically connected to the minus terminal, and which at its plus terminal is electrically connected to the terminal of the starter control.

10. The starter device of claim 9, wherein an intermediate switch is controllable by the back-up switch, the intermediate switch being an electromagnetic switch having an electromagnetic coil, which, at its minus terminal, is electrically connected to the minus terminal, and at its plus terminal is electrically connected to the plus terminal for a power current supply, via an electric line that is interruptible by the intermediate switch.

* * * * *

UNITED STATES PATENT AND TRADEMARK OFFICE
CERTIFICATE OF CORRECTION

PATENT NO.       : 8,368,237 B2                                                  Page 1 of 1
APPLICATION NO. : 12/452623
DATED            : February 5, 2013
INVENTOR(S)      : Biessenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 584 days.

Signed and Sealed this

First Day of September, 2015

Michelle K. Lee
*Director of the United States Patent and Trademark Office*